United States Patent Office 3,793,227
Patented Feb. 19, 1974

3,793,227
CATALYST COMPOSITION FOR FLUID-BED
PRODUCTION OF TRICHLOROETHYLENE
William K. Snead and Fred Abraham, Wheeling, W. Va.,
assignors to PPG Industries, Inc., Pittsburgh, Pa.
No Drawing. Continuation-in-part of abandoned application Ser. No. 799,993, Feb. 17, 1969. This application Apr. 27, 1972, Ser. No. 248,142
Int. Cl. B01j 11/78
U.S. Cl. 252—441      4 Claims

ABSTRACT OF THE DISCLOSURE

Thermal chlorination of hydrocarbons and/or hydrocarbon chlorides using a bed of porous 20 to 200 mesh calcined fuller's earth base particles impregnated with an alkali metal chloride is described. When perchloroethylene and trichloroethylene are produced in the presence of these particles, trichloroethylene production is favored.

CROSS-REFERENCES TO RELATED APPLICATIONS

This application is a continuation-in-part of United States application Ser. No. 799,993, filed Feb. 17, 1969 now abandoned.

THE INVENTION

This invention relates to thermal chlorination reactions. More particularly, the invention relates to the thermal chlorination of hydrocarbons and their incompletely chlorinated derivatives.

Perchloroethylene and trichloroethylene may be prepared by the vapor phase thermal chlorination of 1,2-dichloroethane with chlorine. Inasmuch as this reaction is exothermic, it is often carried out in a fluidized bed of particles which aid in transferring heat from the system.

The thermal chlorination of 1,2-dichloroethane ordinarily results in the production of both perchloroethylene and trichloroethylene. It is customary in these circumstances to report the combined yield of perchloroethylene and trichloroethylene together with the per/tri ratio, which is the weight ratio of perchloroethylene to trichloroethylene in the product stream. Both of these compounds are valuable products, but it is often desirable to achieve the most trichloroethylene possible without seriously reducing the combined yield of both perchloroethylene and trichloroethylene.

It has now been found that the per/tri ratio can be reduced by conducting the thermal chlorination in a fluidized bed of normally porous, solid-base particles which have been impregnated with at least one alkali metal chloride which is essentially free of multiple valence metal chlorides which is essentially free of multiple valence metal chlorides such as copper chloride to significantly reduce the surface area of the porous solid base particles. Preferred alkali metal chlorides are sodium chloride and potassium chloride.

Although it is not intended to limit the invention to any particlar theory, it is believed that the reduction in surface area favors a product having a low per/tri ratio. While it is generally believed that the composite particles are non-catalytic in the ordinary sense, the nature of the impregnating salt does appear to have some effect upon the per/tri ratio.

The base of the composite particle is porous in order to provide a finished particle of low density. Low density particles are desirable because of their ease of fluidization. Moreover, the lower density allows the use of larger particles which permit the use of higher velocities in the reactor with less catalytic entrainment of the particles in the product stream leaving the reactor. The bulk density of the base particles usually ranges from about 5 lb./ft.$^3$ to about 80 lb./ft.$^3$.

A particularly effective base particle is "Florex," a calcined fuller's earth manufactured by the Floridin Corporation. The surface area of this material is usually about 100 m.$^2$/g. to about m.$^2$/g. Surface area as used herein is determined by the Brunauer-Emmett-Teller (BET) method substantially as described in the Journal of the American Chemical Society, vol. 60, page 309 (1938) using nitrogen as the adsorbate.

The particular manner in which the alkali metal chloride is placed upon the base particles may be somewhat varied. Generally speaking, the base particles are impregnated with the alkali metal chloride. The impregnation may be conducted by immersion of the base particles in a solution of the alkali metal chloride by evaporation of the solvent. If desired, an alkali metal chloride solution may be placed on the carrier particles while rotating the carrier particles in a mixing or tumbling device. A fluidized bed of base particles may be sprayed with alkali metal chloride solution and enough heat supplied to the bed to evaporate the water of solution. The amount of alkali metal chloride applied to the base particle may vary. Ordinarily, the alkali metal chloride constitutes about 5 percent to about 40 percent by weight of the total composite particle. Ranges of from about 15 percent to about 25 percent are more usual. About 21 percent is customary. The surface area of the composite particles generally ranges from about 0.5 m.$^2$/g. to about 100 m.$^2$/g. The usual surface area is from about 25 m.$^2$/g. to about 50 m.$^2$/g. The bulk density of the composite particles ordinarily ranges from about 10 lb./ft.$^3$ to about 65 lb./ft.$^3$. Particles having a bulk density in the range of from about 35 lb./ft.$^3$ to about 50 lb./ft.$^3$ are preferred.

Various temperatures may be employed in thermal chlorination reactions. Generally speaking, the reaction is conducted at temperatures ranging from about 300° C. to about 525° C. when hydrocarbons and their partially chlorinated derivatives are thermally chlorinated. When 1,2-dichloroethane is thermally chlorinated, temperatures in the range of about 350° C. to about 450° C. are ordinarily preferred. Atmospheric pressure is the usual practice, but greater or lesser pressures may be used as desired.

While any size particle which is fluidizable and which is substantially retained in the reactor may be used, particles having sizes falling in the range of 20 to 200 mesh (U.S. Sieve Series) are ordinarily used. Particle sizes of 60 to 200 mesh are preferred in small reactors having a diameter of up to about 4 inches. Larger particles, 30 to 100 mesh for example, are preferred in large reactors having a diameter greater than about 4 inches. Even when all of the particles initially fed to the reactor fall within this range, continued usage will result in the particle distribution being shifted to the smaller sizes due to attrition. It is preferred to maintain at least 70 percent by weight of the particles in the range of 20 to 200 mesh.

Reduction of the per/tri ratio may be further enhanced by introducing small quantities of oxygen or nitric oxide to the thermal chlorination reaction. These are usually introduced in an amount equal to about 0.2 to about 3.0 percent by volume of the chlorine introduced.

Ordinarily, but not always, the yield of trichloroethylene and perchloroethylene combined decreases as the per/tri ratio decreases. Thus, the operating point is chosen by balancing the combined yield with the per/tri ratio. This is, of course, chiefly a matter of economics and will vary from time to time. Usually, per/tri ratios in the range of from about 0.1 to about 0.5 are preferred.

The basic principles of the present invention have been incorporated by way of example in the following specific embodiments.

EXAMPLE I

Florex calcined fuller's earth was ground and screened to obtain a distribution of particles as follows:

| Mesh, U.S. Sieve Series: | Percent by weight |
|---|---|
| 60 to 70 | 5 |
| 70 to 80 | 10 |
| 80 to 100 | 25 |
| 100 to 120 | 25 |
| 120 to 170 | 25 |
| 170 to 200 | 10 |

A 1400 gram sample of these particles was placed in a 2-inch ID glass tube. While being fluidized with a stream of air, the particles were heated to 250° C. using an electric heating coil surrounding the tube. Two thousand (2000) milliliters of an aqueous 23 percent by weight KCl solution were added dropwise to the heated fluidized particles. The impregnated particles thus prepared were dried at 250° C. for 3 hours in an electric oven. Analysis of the impregnated particles indicated the presence of 9.3 weight percent chloride which corresponds to about 19.5 percent KCl by weight. The BET surface area was 43.3 m.$^2$/g.

EXAMPLE II

A nickel alloy reactor was employed as a fluidized bed reactor and comprised a 2-inch internal diameter tube terminated on its lower end by a gas distributing region of varying cross-section which was generally frusto-conical in shape. The tube and the gas distributing section combined were about 3 feet in length. A particle disengaging section positioned atop the 2-inch tube varied in internal diameter from 2 inches at its lower portion to 4 inches at its top and constituted an additional 1.4 feet of height. A ¼-inch nickel alloy sphere inserted into the reactor did not pass through the narrow portion of the gas distributor. Communicating with the bottom of the gas distributor was a windbox.

In operation, liquid 1,2-dichloroethane was metered into a vaporizer. The 1,2-dichloroethane vapors there generated were combined with a metered stream of chlorine and introduced into the wind-box. The gaseous mixture entered the fluidized bed reaction zone by moving into the gas distributor and past the sphere. The sphere served to substantially prevent particles from dropping into the windbox. The reaction gases continued through the tube to the particle disengaging section where they were withdrawn from the reactor.

Using this apparatus and procedure and using impregnated particles prepared according to Example I, 2.53 standard liters/min. of 1,2-dichloroethylene vapor and 2.30 standard liters/min. of chlorine were introduced into the fluidized bed which was maintained at about 436° C. Feed materials are often fed at conditions other than standard conditions. For purposes of data analysis, however, feed rates are reduced to standard conditions which are defined at 0° C. and 760 mm. Hg absolute pressure. The reactor pressure was slightly above atmospheric pressure. The superficial velocity was 0.30 ft./sec. Superficial contact time was 8.4 seconds. Product having the analysis shown in Table I was removed at a rate of 618.4 grams/hr.

TABLE I

Liquid product analysis, weight percent:

| | |
|---|---|
| $C_2H_3Cl$ | 12.8 |
| Cis-1,2-$C_2H_2Cl_2$ | 17.1 |
| Trans-1,2-$C_2H_2Cl_2$ | 14.7 |
| 1,1-$C_2H_2Cl_2$ | 10.0 |
| $C_2HCl_3$ | 30.4 |
| $C_2Cl_4$ | 0.78 |
| $C_2H_5Cl$ | 0.00 |
| 1,2-$C_2H_4Cl_2$ | 0.00 |
| 1,1-$C_2H_4Cl_2$ | 0.00 |
| 1,1,1-$C_2H_3Cl_3$ | 0.00 |
| 1,1,2-$C_2H_3Cl_3$ | 9.54 |
| 1,1,2,2-$C_2H_2Cl_4$ | 2.50 |
| 1,1,1,2-$C_2H_2Cl_4$ | 1.18 |
| $C_2HCl_5$ | 0.22 |
| $C_2Cl_6$ | 0.00 |
| $C_1$ (combined) | 0.30 |
| $C_4$ (combined) | 0.14 |
| Unknowns | 0.32 |

The carbon and chloride balances are shown in Table II.

TABLE II

Carbon balance, mole percent:

| | |
|---|---|
| Utilized | 88.85 |
| Unreacted | 0.00 |
| Burned | 0.34 |
| Closure | 89.19 |

Chloride balance, mole percent:

| | |
|---|---|
| Utilized | 50.35 |
| HCl formed | 49.96 |
| Free $Cl_2$ | 0.00 |
| Closure | 100.31 |

The yield of trichloroethylene and perchloroethylene combined was 21.5 percent by weight. The per/tri ratio was 0.0257.

EXAMPLE III

Using the apparatus and procedure of Example II and using impregnated particles prepared according to Example I, 1.79 standard liters/min. of 1,2-dichloroethane vapor and 2.96 standard liters/min. of chlorine were introduced into the fluidized bed which was maintained at about 435° C. The reactor pressure was slightly above atmospheric pressure. The superficial velocity was 0.29 ft./sec. Superficial contact time was 8.5 seconds. Product having the analysis shown in Table III was removed at the rate of 580.6 grams/hr.

TABLE III

Liquid product analysis, weight percent:

| | |
|---|---|
| $C_2H_3Cl$ | 0.46 |
| Cis-1,2-$C_2H_2Cl_2$ | 6.03 |
| Trans-1,2-$C_2H_2Cl_2$ | 7.92 |
| 1,1-$C_2H_2Cl_2$ | 2.63 |
| $C_2HCl_3$ | 55.3 |
| $C_2Cl_4$ | 18.3 |
| $C_2H_5Cl$ | 0.00 |
| 1,2-$C_2H_4Cl_2$ | 0.00 |
| 1,1-$C_2H_4Cl_2$ | 0.00 |
| 1,1,1-$C_2H_3Cl_3$ | 0.0015 |
| 1,1,2-$C_2H_3Cl_3$ | 0.66 |
| 1,1,2,2-$C_2H_2Cl_4$ | 2.02 |
| 1,1,1,2-$C_2H_2Cl_4$ | 1.93 |
| $C_2HCl_5$ | 3.76 |
| $C_2Cl_6$ | 0.042 |
| $C_1$ (combined) | 0.19 |
| $C_4$ (combined) | 0.60 |
| Unknowns | 0.168 |

The carbon and chloride balances are shown in Table IV.

TABLE IV

Carbon balance, mole percent:
- Utilized _____ 92.76
- Unreacted _____ 0.00
- Burned _____ 0.44
- Closure _____ 93.20

Chloride balance, mole percent:
- Utilized _____ 51.89
- HCl formed _____ 51.91
- Free $Cl_2$ _____ 0.00
- Closure _____ 103.90

The yield of trichloroethylene and perchloroethylene combined was 64.4 percent by weight. The per/tri ratio was 0.331.

EXAMPLE IV

Using the apparatus and procedure of Example II and using impregnated particles prepared according to Example I, 1.57 standard liters/min. of 1,2-dichloroethane vapor and 3.16 standard liters/min. of chlorine were introduced into the fluidized bed which was maintained at about 436° C. The reactor pressure was slightly above atmospheric pressure. The superficial velocity was 0.29 ft./sec. Superficial contact time was 8.6 seconds. Product having the analysis shown in Table V was removed at a rate of 567.4 grams/hr.

TABLE V

Liquid product analysis, weight percent:
- $C_2H_3Cl$ _____ 0.15
- Cis-1,2-$C_2H_2Cl_2$ _____ 2.62
- Trans-1,2-$C_2H_2Cl_2$ _____ 3.51
- 1,1-$C_2H_2Cl_2$ _____ 0.63
- $C_2HCl_3$ _____ 43.5
- $C_2Cl_4$ _____ 38.8
- $C_2H_5Cl$ _____ 0.00
- 1,2-$C_2H_4Cl_2$ _____ 0.00
- 1,1-$C_2H_4Cl_2$ _____ 0.00
- 1,1,1-$C_2H_3Cl_3$ _____ 0.001
- 1,1,2-$C_2H_3Cl_3$ _____ 0.25
- 1,1,2,2-$C_2H_2Cl_4$ _____ 1.80
- 1,1,1,2-$C_2H_2Cl_4$ _____ 1.12
- $C_2HCl_5$ _____ 5.79
- $C_2Cl_6$ _____ 0.83
- $C_1$ (combined) _____ 0.17
- $C_4$ (combined) _____ 0.71
- Unknowns _____ 0.061

The carbon and chloride balances are shown in Table VI.

TABLE VI

Carbon balance, mole percent:
- Utilized _____ 94.17
- Unreacted _____ 0.00
- Burned _____ 0.30
- Closure _____ 94.47

Chloride balance, mole percent:
- Utilized _____ 52.22
- HCl formed _____ 52.13
- Free $Cl_2$ _____ 0.16
- Closure _____ 104.51

The yield of trichloroethylene and perchloroethylene combined was 76.3 percent by weight. The per/tri ratio was 0.892.

EXAMPLE V

This example will illustrate the effect of a multiple valence metal halide, such as copper chloride, on the per/tri ratio.

Heat transfer particles were prepared by placing a 1500 gram sample of Florex particles having a size distribution substantially the same as in Example I into a 2-inch ID glass tube. While being fluidized with a stream of air, the particles were heated to 250° C. using an electric heating coil surrounding the tube. Two thousand (2000) milliliters of an aqueous solution containing 10.30 percent by weight KCl and 14.80 percent by weight $CuCl_2$ were added dropwise to the heated fluidized particles. The impregnated particles thus prepared were dried at 250° C. for 3 hours in an electric oven. The BET surface area was 39.6 m.$^2$/g.

Using the apparatus of Example II and the copper bearing particles prepared above, 1.63 standard liters/min. of 1,2-dichloroethylene vapor and 2.96 standard liters/min. of chlorine were introduced into the fluidized bed which was maintained at about 436° C. The reactor pressure was slightly above atmospheric pessure. The superficial velocity was 0.28 ft./sec. Superficial contact time was 8.6 seconds. Product having the analysis shown in Table VII was removed at a rate of 558.6 grams/hr.

TABLE VII

Liquid product analysis, weight percent:
- $C_2H_3Cl$ _____ 0.17
- Cis-1,2-$C_2H_2Cl_2$ _____ 7.35
- Trans-1,2-$C_2H_2Cl_2$ _____ 5.27
- 1,1-$C_2H_2Cl_2$ _____ 0.57
- $C_2HCl_3$ _____ 44.4
- $C_2Cl_4$ _____ 30.6
- $C_2H_5Cl$ _____ 0.00
- 1,2-$C_2H_4Cl_2$ _____ 0.00
- 1,1-$C_2H_4Cl_2$ _____ 0.00
- 1,1,1-$C_2H_3Cl_3$ _____ 0.00
- 1,1,2-$C_2H_3Cl_3$ _____ 0.89
- 1,1,2,2-$C_2H_2Cl_4$ _____ 8.47
- 1,1,1,2-$C_2H_2Cl_4$ _____ 0.07
- $C_2HCl_5$ _____ 1.53
- $C_2Cl_6$ _____ 0.04
- $C_1$ (combined) _____ 0.28
- $C_4$ (combined) _____ 0.33
- Unknowns _____ 0.38

The carbon and chloride balances are shown in Table VIII.

TABLE VIII

Carbon balance, mole percent:
- Utilized _____ 98.83
- Unreacted _____ 0.00
- Burned _____ 0.53
- Closure _____ 99.36

Chloride balance, mole percent:
- Utilized _____ 54.89
- HCl formed _____ 51.93
- Free $Cl_2$ _____ 0.00
- Closure _____ 106.82

The yield of trichloroethylene and perchloroethylene combined was 66.48 percent by weight. The per/tri ratio was 0.689.

EXAMPLE VI

This example will illustrate the effect of the untreated carrier on the per/tri ratio.

Using the apparatus of Example II and unimpregnated Florex particles having a size distribution substantially the same as in Example I, 1.61 standard liters/min. of 1,2-dichloroethane vapor and 2.96 standard liters/min. of chlorine were introduced into the fluidized bed which was maintained at about 435° C. The reactor pressure was slightly above atmospheric pressure. The superficial velocity was 0.28 ft./sec. Superficial contact time was 9.5 seconds. Product having the analysis shown in Table IX was removed at a rate of 522.7 grams/hr.

TABLE IX

Liquid product analysis, weight percent:

| | |
|---|---:|
| $C_2H_3Cl$ | 0.50 |
| Cis-1,2-$C_2H_2Cl_2$ | 9.39 |
| Trans-1,2-$C_2H_2Cl_2$ | 7.22 |
| 1,1-$C_2H_2Cl_2$ | 1.02 |
| $C_2HCl_3$ | 40.6 |
| $C_2Cl_4$ | 38.0 |
| $C_2H_5Cl$ | 0.00 |
| 1,2-$C_2H_4Cl_2$ | 0.00 |
| 1,1-$C_2H_4Cl_2$ | 0.00 |
| 1,1,1-$C_2H_3Cl_3$ | 0.00 |
| 1,1,2-$C_2H_3Cl_3$ | 0.14 |
| 1,1,2,2-$C_2H_2Cl_4$ | 0.80 |
| 1,1,1,2-$C_2H_2Cl_4$ | 0.84 |
| $C_2HCl_5$ | 0.79 |
| $C_2Cl_6$ | 0.00 |
| $C_1$ (combined) | 0.10 |
| $C_4$ (combined) | 1.27 |
| Unknowns | 1.38 |

The carbon and chloride balances are shown in Table X.

TABLE X

Carbon balance, mole percent:

| | |
|---|---:|
| Utilized | 91.09 |
| Unreacted | 0.00 |
| Burned | 0.26 |
| Closure | 91.35 |

Chloride balance, mole percent:

| | |
|---|---:|
| Utilized | 49.06 |
| HCl formed | 52.90 |
| Free $Cl_2$ | 0.00 |
| Closure | 101.96 |

The yield of trichloroethylene and perchloroethylene combined was 64.07 percent by weight. The per/tri ratio was 0.936.

While the particles herein have been described primarily with reference to the thermal chlorination of 1,2-dichloroethane and the per/tri ratio, they may generally be used in the thermal chlorination of hydrocarbons having 1 to 4 carbon atoms and their incompletely chlorinated derivatives. Usually, hydrocarbons having 2 carbon atoms and their incompletely chlorinated derivatives are used. Representative examples are methane, ethane, propane, ethylene, ethyl chloride, 1,2-dichloroethane, and 1,1,2-trichloroethane. Similarly, while the greater number of beneficial properties of the composite particles described herein may be exploited in fluidized bed reactions, nevertheless, the composite particles may also be used in a fixed bed thermal chlorination reaction.

While the invention has been described with reference to certain illustrative examples, it is not intended that they be limited, except insofar as appears in the accompanying claims.

We claim:

1. A plurality of composite particles at least 70 percent by weight of which are in the size range of from 20 to 200 mesh consisting essentially of calcined fuller's earth base particles having a surface area ranging from 100 m.²/g. to 250 m.²/g. impregnated with 5 percent to 40 percent by weight, basis the composite particles, alkali metal chloride selected from the group consisting of sodium chloride and potassium chloride, said composite particles having a surface area in the range of from 0.5 m.²/g. to 100 m.²/g. and a bulk density of from 10 lb./ft.³ to 65 lb./ft³.

2. The plurality of composite particles of claim 1 wherein said alkali metal chloride is sodium chloride.

3. The plurality of composite particles of claim 1 wherein said alkali metal chloride is potassium chloride.

4. The plurality of composite particles of claim 1 wherein the alkali metal chloride impregnating said calcined fuller's earth base particles constitutes about 21 percent by weight of the composite particle.

References Cited

UNITED STATES PATENTS

| | | | |
|---|---|---|---|
| 3,484,494 | 12/1969 | Carson | 252—441 X |
| 3,299,152 | 1/1967 | Inaba et al. | 252—441 X |
| 3,256,352 | 6/1966 | Bohl et al. | 260—659 A X |
| 3,642,918 | 2/1972 | Bohl et al. | 260—654 A |

PATRICK P. GARVIN, Primary Examiner

U.S. Cl. X.R.

260—654 H